Oct. 14, 1924.  
A. L. DRUM  
1,511,448  
ELECTRICALLY PROPELLED AIRCRAFT  
Filed Feb. 18, 1921  
4 Sheets-Sheet 2

INVENTOR  
A. L. Drum  
BY  
Duell, Warfield & Duell  
ATTORNEY

Oct. 14, 1924.  
A. L. DRUM  
1,511,448  
ELECTRICALLY PROPELLED AIRCRAFT  
Filed Feb. 18, 1921 4 Sheets-Sheet 3
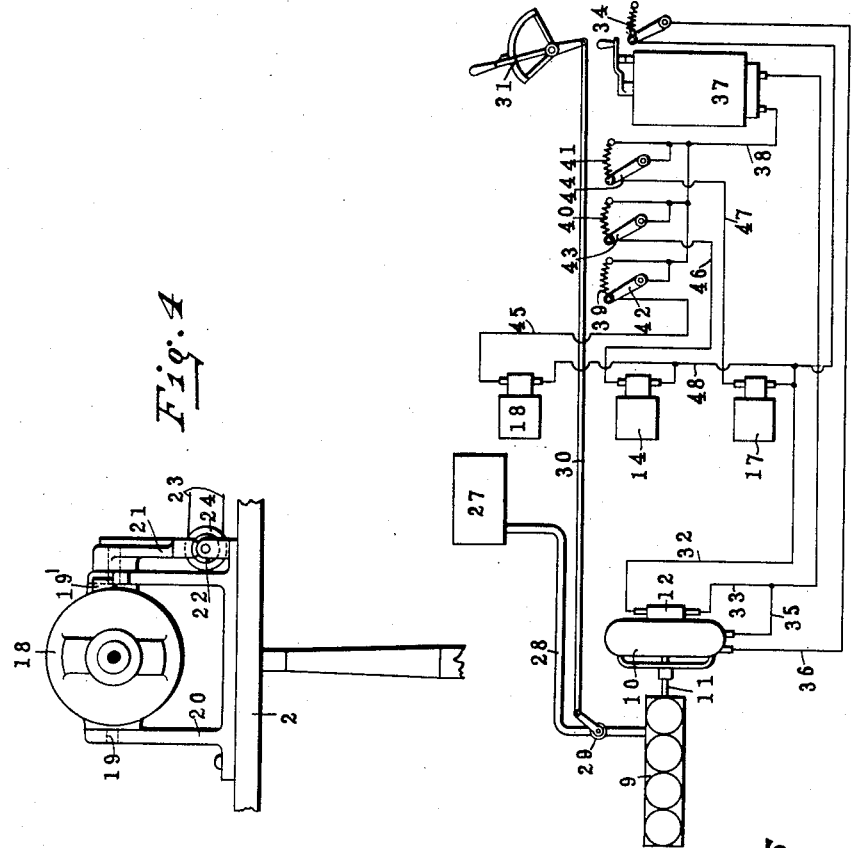
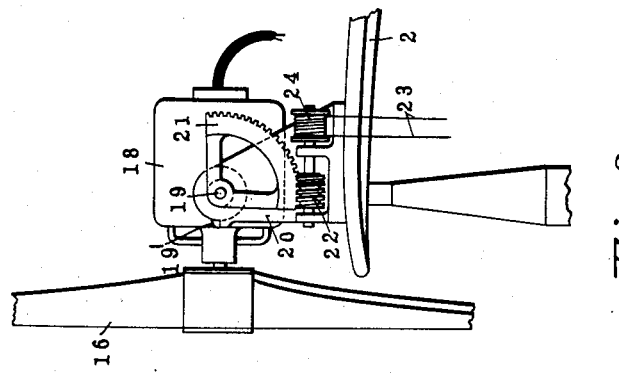
INVENTOR  
*A. L. Drum*  
BY  
*Duell, Warfield & Duell*  
ATTORNEY Oct. 14, 1924.
A. L. DRUM
1,511,448
ELECTRICALLY PROPELLED AIRCRAFT
Filed Feb. 18, 1921     4 Sheets-Sheet 4
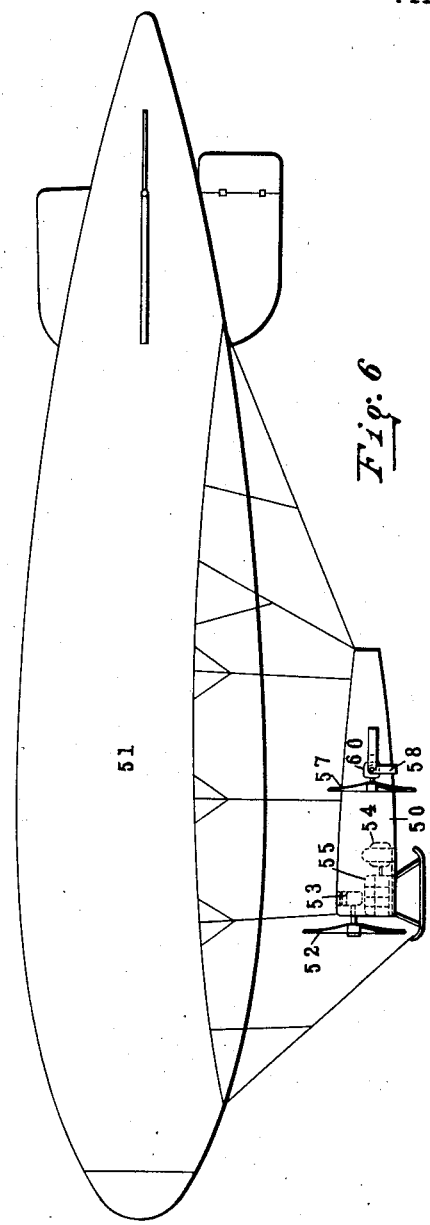
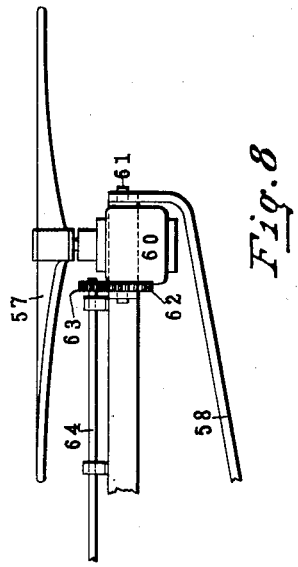
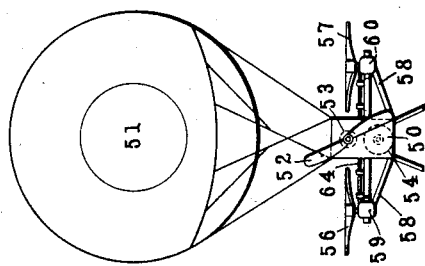
INVENTOR
A. L. Drum
BY
Duell, Warfield & Duell
ATTORNEY Patented Oct. 14, 1924.

1,511,448

UNITED STATES PATENT OFFICE.

ALPHONSUS L. DRUM, OF CHICAGO, ILLINOIS.

ELECTRICALLY-PROPELLED AIRCRAFT.

Application filed February 18, 1921. Serial No. 445,918.

*To all whom it may concern:*

Be it known that I, ALPHONSUS L. DRUM, a citizen of the United States, residing at Chicago, in the county of Cook and State of Illinois, have invented certain new and useful Improvements in Electrically-Propelled Aircraft, of which the following is a full, clear, and exact description, such as will enable others skilled in the art to which it appertains to make and use the same.

This invention relates to air-craft and more particularly to air-craft wherein the propellers are driven by electric motors.

It is an object of the invention to provide an improved system of air-craft propulsion wherein great flexibility and delicacy of control is secured resulting in advantages in maneuvering the air-craft and in regulating the speed thereof.

It is a further object to provide an improved system of aircraft propulsion readily lending itself to accuracy in balancing the air-craft resulting in increased stability and consequent reliability in flight, and in the execution of various maneuvers.

It is a further object to provide means for air-craft propulsion including a novel and flexible system of power distribution and control whereby the propelling means may be advantageously disposed at various portions in the air-craft for securing stability, and flexibility in executing maneuvers.

Another object is to provide an improved system of air-craft propulsion wherein electric energy is generated at a central power plant under the control of the pilot and distributed for driving the propelling means.

Other objects will be in part obvious as the detail description proceeds and in part pointed out in connection therewith.

The invention accordingly consists in the features of construction, combinations of elements and arrangement of parts which will be exemplified in the construction hereinafter set forth, and the scope of the application of which will be indicated in the following claims.

In the accompanying drawings wherein an illustrative embodiment of the invention is disclosed, Fig. 1 is a side elevation of an airplane equipped with the invention, certain parts being broken away to disclose more clearly the arrangement of elements;

Fig. 3 is a fragmentary enlarged view of a detail showing the driving mechanism for one of the lifting propellers and means for shifting the same from lifting position to flight position;

Fig. 4 is a front elevation of Fig. 3, the propeller being removed;

Fig. 5 is a diagrammatic view showing the electrical connections for controlling the driving motors;

Fig. 6 is a side elevation of a modification embodying the invention;

Fig. 7 is a front elevation thereof; and

Fig. 8 is an enlarged fragmentary view showing the arrangement for one of the lifting propellers.

Figure 1:
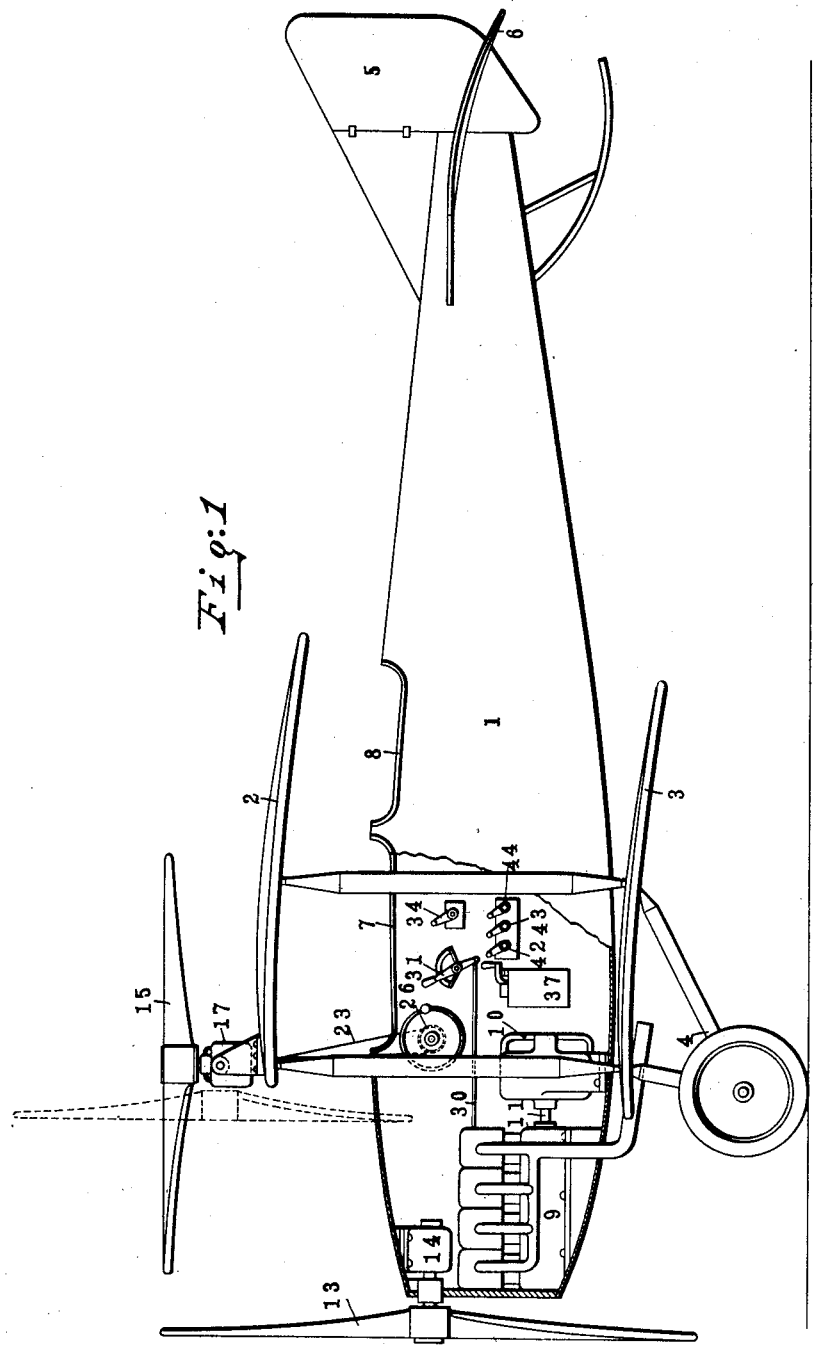

Referring first to the embodiment shown in Figs. 1 to 5, for the purpose of illustrating the application of this invention an air-plane of the biplane type is shown having a fuselage or nacelle 1, upper and lower planes 2 and 3, a landing chassis 4, vertical rudder 5 and elevator flaps 6. The fuselage is provided adjacent the planes with a pilot's cock-pit 7 having control apparatus conveniently arranged therein to be easily accessible by the pilot. A passenger cock-pit 8 in the rear of the pilot's cock-pit may also be provided.

Located in the forward portion of the fuselage and firmly secured to the framework thereof is a prime mover 9 which, in the present embodiment, is indicated as an internal combustion motor preferably adapted to be driven by gasoline or oil. It is to be understood, however, that some other type of prime mover, such as a steam or gas turbine or reciprocating steam engine, is contemplated and may be substituted for the internal combustion motor shown in the drawing. In case steam is to be employed as motive power, steam generating apparatus of suitable design, preferably employing oil or other fuel, will be provided and suitably mounted in the forward portion of the fuselage.

An electric generator 10 is connected to be driven by the prime mover 9, the shaft 11 of the latter being preferably extended to include the shaft of the generator motor, forming a direct-connection between the driving and driven elements. This generator may be of the alternating current type which is preferred for simplicity of regulation of the system and freedom from sparking, or it may be of the direct-current type having a commutator 12 and commutator brushes with conductors leading therefrom to supply energy for driving the propellers as will be disclosed more in detail hereinafter.

One or more driving propellers are provided for driving the air-craft in flight through the air, this being shown in the illustrated embodiment as a single tractor propeller 13 suitably rotatably mounted in the forward portion of the fuselage in rigid position, an electric motor 14 being directly connected to the propeller shaft and suitably mounted in the frame in the fuselage.

Figure 2:
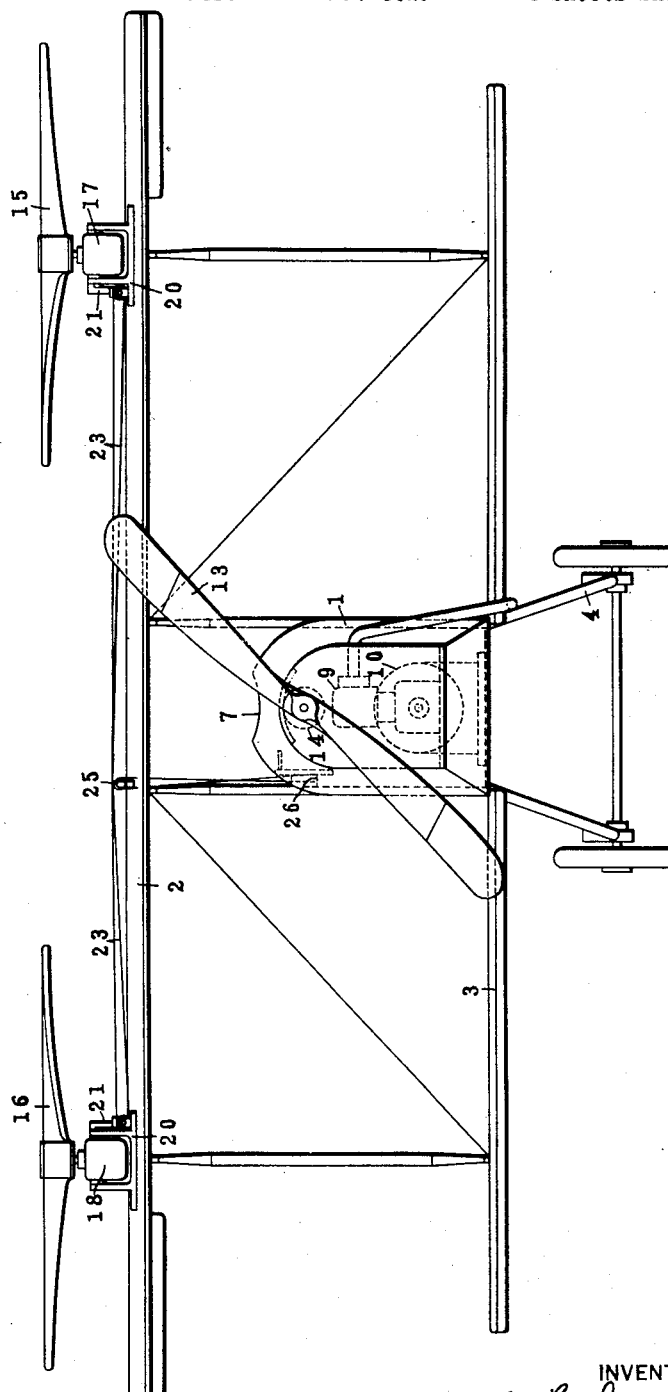
Fig. 2 is a front elevation thereof.

In order to raise the airplane from the ground substantially perpendicularly preparatory to flight and without any preliminary run along the surface of the earth, one or more lifting propellers may be provided as shown in Figs. 1 and 2. Such lifting propellers 15 and 16 are employed mounted at the leading edge of the upper plane and spaced on each side of the vertical plane of the fuselage. As shown particularly in Figs. 3 and 4 each of these lifting propellers has a driving motor 17 or 18 direct-connected to the respective propeller shaft, each motor being pivotally carried upon trunnions 19 mounted in a bracket 20 secured to the upper plane, a stop or lug 19′ limiting turning movement in one direction on the trunnion. This pivotal mounting provides means whereby the propeller and its driving motor are movable as a unit in a vertical plane enabling the propeller to exert a lifting effort upon the airplane or to assist in the flight of the same through the air.

Manually operable means under the control of the pilot are provided for simultaneously shifting the lifting propeller from lifting position to driving position and vice versa, but it is obvious that an electric motor under the control of the pilot may be employed for this purpose. As shown, this means comprises segmental gears 21 rigidly secured to the trunnions 19 of the motors, the teeth thereof engaging worms 22 adapted to be driven by flexible cables 23 wound on drums 24, the latter being rigidly secured to rotate with the worms. These flexible cables pass over a guide roller 25 mounted on the upper plane and extend to the cock-pit where they are wound upon a drum 26 mounted so as to be rotatable in either direction by the pilot. By this arrangement it is obvious that the lifting propeller may be moved as desired by appropriate rotation of the drum 26, the propellers being thereby positioned to exert lifting effort or driving effort upon the airplane.

The respective propeller motors are electrically connected to receive energy from the generator 10 of the central power plant, and control means are provided for individual or collective control thereof. Means for controlling the speed of the prime mover and the voltage of the generator are also provided, the various controlling devices being located in the cock-pit conveniently accessible to the pilot. Any approved construction for this control may be employed, a diagrammatic view of a system embodying one form being shown in Fig. 5, and an arrangement of the manual elements for controlling the same being shown in Fig. 1. As shown the prime mover or motor 9 is arranged to be supplied with fuel from a reservoir 27 by a conduit 28, a valve 29 in the latter being connected for manual control by a rod 30 and lever 31 whereby the speed of the prime mover may be regulated as desired. Main conductors 32 and 33 lead from the generator brushes to conduct energy to the respective propeller motors, the generator shunt field being connected across the main conductors through an adjustable controlling rheostat 34 by conductors 35, and 36 whereby the generator voltage is under the control of the pilot. The main conductor 33 is connected to one terminal of a controller 37 of any approved design, and a conductor 38 is connected to the other terminal thereof, conductor 38 being connected to one end of each of the resistance coils of adjustable rheostats 39, 40 and 41. The conductor 38 is also connected to the adjusting contact arms 42, 43 and 44 of the rheostats and the opposite ends of each of the resistance coils are connected by conductors 45, 46 and 47 to one brush of each of the propeller motors, 17, 14 and 18 respectively. The other brush of each of said motors is connected to the main lead 32 through a common return conductor 48.

By means of the connections described it will be seen that the propeller motors may be controlled collectively by adjustment of the engine speed through the control valve 29, by adjustment of the generator voltage through the field rheostat 34, or by operation of the controller 37. It will be noted that adjustment of the controller 37 controls simultaneously the energy delivered to all the driving motors. Individual control of each motor is secured by individual adjustment of the rheostat 39, 40 or 41 connected in the individual circuit of each motor. By this arrangement it will be seen that a particularly flexible control system for the propellers is secured with consequent flexibility and delicacy of control of the movements of the airplane in flight and in the execution of various maneuvers.

The operation of this system of propulsion is embodied in the foregoing description and the same will be clear to those skilled in the art without reiteration.

In large types of airplanes two or more prime movers each having a direct-connected generator may be employed the generating units being disposed in the fuselage to effectively balance the airplane and placed under the control of the pilot in a manner similar to that described above. Also in large types of airplanes two or more driving propellers may be employed with driving motors direct-connected to each, these propellers being disposed on the airplane to secure most advantageous driving conditions and balance.

In a modification of the invention shown in Figs. 6, 7 and 8 the system of propulsion as particularly described above is applied to a dirigible balloon of the lighter-than-air type. As shown a nacelle 50 is suspended from the gas bag 51 in the usual manner the driving propeller 52 being direct-connected to an electric motor 53 energy being supplied to the latter from a generator 54 direct-connected to a prime mover 55. Lifting propellers 56 and 57 are supported on brackets 58 extending from opposite sides of the nacelle and are driven by electric motors 59 and 60 direct-connected thereto. Each motor is preferably mounted on its bracket 58 by trunnions 61 and is adapted to be swung with its propeller to exert lifting effort in the position shown in Fig. 7 or driving effort as shown in Fig. 6. These propellers may also be swung to exert downward effort to cause the dirigible to move downwardly. Turning movement of propellers 56 and 57 is effected by means of a toothed gear 62 secured on trunnion 61, a pinion 63 mounted on a driving shaft 64 engaging the gear 62. The system of control for the propelling system of this embodiment is similar to that shown in Fig. 5 and described in detail above. By the system of propulsion as disclosed it is evident that a flexible system of control is provided for directing the dirigible in flight and in the various maneuvers it may be called upon to execute.

In the system of electric propulsion and control above described as applied either to an airplane or to air-craft of the lighter-than-air type it is obvious that the speed of any propeller motor may be individually controlled or the speed of several motors may be simultaneously controlled. Also the controllers may be arranged so as to stop or reverse the direction of rotation of any individual propeller motor or to simultaneously reverse all or a plurality of said motors, whereby it is possible to check the speed of the air-craft suddenly or even to drive the same rearwardly in cases of emergency. Sharp turns to right or left, upwardly or downwardly, may also be accomplished by reversing appropriate propeller motors. As a single example, assuming that the system of control herein described is applied to that type of airplane provided with two tractor propellers spaced on opposite sides of the fuselage, a sharp turn to the right may be executed by slowing down, stopping or reversing the motor of the right tractor propeller while the left is operating at full speed to drive the aircraft in forward direction. It is also obvious that a similar maneuver toward the left may be executed by controlling the operation of the left propelled.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:

1. In a system of aircraft propulsion, in combination, spaced flight propellers for the air craft, an electric driving motor connected to each of said propellers, a central power plant including a prime mover and an electric generator connected to be driven thereby for supplying energy to all of said motors to furnish the principal flight propelling force and auxiliary controlling force to the propellers, a plurality of independent controlling means under control of a single operator for controlling the power plant to regulate collectively the energy delivered therefrom to all of said propellers, and controlling means under the control of the operator for controlling, independently of the first mentioned controlling means, the individual delivery of energy to each of said propellers.

2. In a system of aircraft propulsion, in combination, a main flight propeller and auxiliary controlling propellers for the aircraft, an electric driving motor direct connected to each of said propellers, a central power plant including a prime mover and an electric generator connected to be driven thereby for supplying energy to all of said motors to furnish the principal flight propelling force and the auxiliary control force to the propellers, controlling means under control of the pilot for direct control of the power plant to regulate collectively the energy delivered therefrom to all of said propellers, means to control collectively all of said propellers independently of direct power plant control, and controlling means under control of the pilot for controlling, independently of said first mentioned controlling means, the individual delivery of energy to each of said propellers.

3. In a system of aircraft propulsion, in combination, a propeller for the aircraft, an electric motor connected to said propeller, a power plant including a prime mover and an electric generator connected to be driven thereby for supplying energy to said motor, a plurality of independent controlling means under control of a single operator for controlling said power plant to regulate the energy delivered therefrom to said propeller, and controlling means under control of the operator for controlling independently of said first mentioned controlling means the energy delivered to said propeller.

4. In combination, an aircraft of the heavier than air type having a fuselage and a laterally extending stationary sustaining plane, a flight tractor propeller disposed adjacent to and forwardly of said plane, an additional propeller for the aircraft spaced from said first propeller, an electric driving motor direct connected to each of said propellers, a central power plant carried in said fuselage and including a prime mover and an electric generator connected to be driven thereby for supplying energy to said motors to furnish the principal flight propelling force and auxiliary controlling force to the propellers, controlling means under the control of the pilot for direct control of the power plant to regulate collectively the energy delivered therefrom to said propellers, means to control collectively the energy delivered to said propellers independent of direct power plant control and controlling means under control of the pilot for controlling independently of said first mentioned controlling means the individual delivery of energy to each of said propellers.

5. In combination, an aircraft of the heavier than air type having a fuselage and a laterally extending stationary sustaining plane, a main flight tractor propeller disposed adjacent to and forwardly of said plane, an electric motor connected to drive said propeller, a central power plant carried in said fuselage including a prime mover and an electric generator connected to be driven thereby for supplying energy to said motor to furnish the principal flight propelling force to the propeller, a plurality of independent controlling means under control of a single operator for direct control of the power plant to regulate the energy delivered therefrom to said propeller, and controlling means under control of the operator for controlling independently of said first mentioned controlling means the energy delivered to said propeller.

In testimony whereof I affix my signature in the presence of two witnesses.

ALPHONSUS L. DRUM.

Witnesses:
E. A. TURPIN,
E. L. PALMER.